Sept. 8, 1942.　　　　C. E. KOLIAS　　　　2,295,178
AUTOMOBILE THEFT INDICATOR
Filed July 14, 1941　　　3 Sheets-Sheet 1
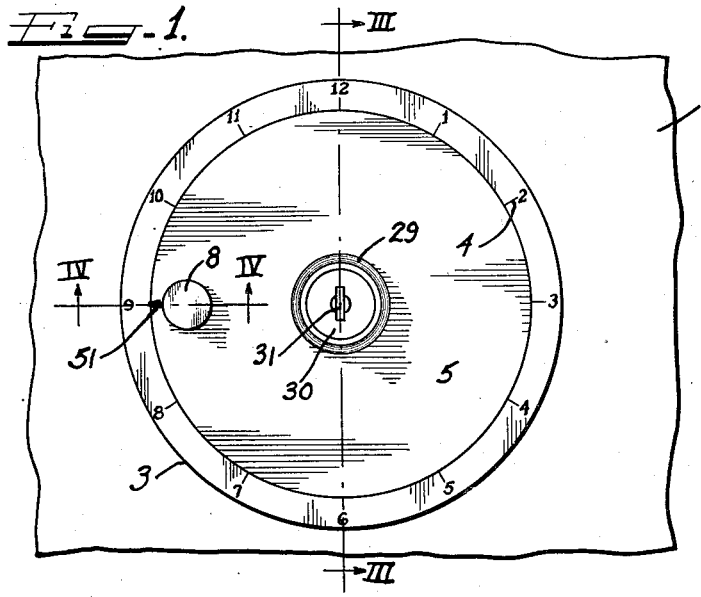
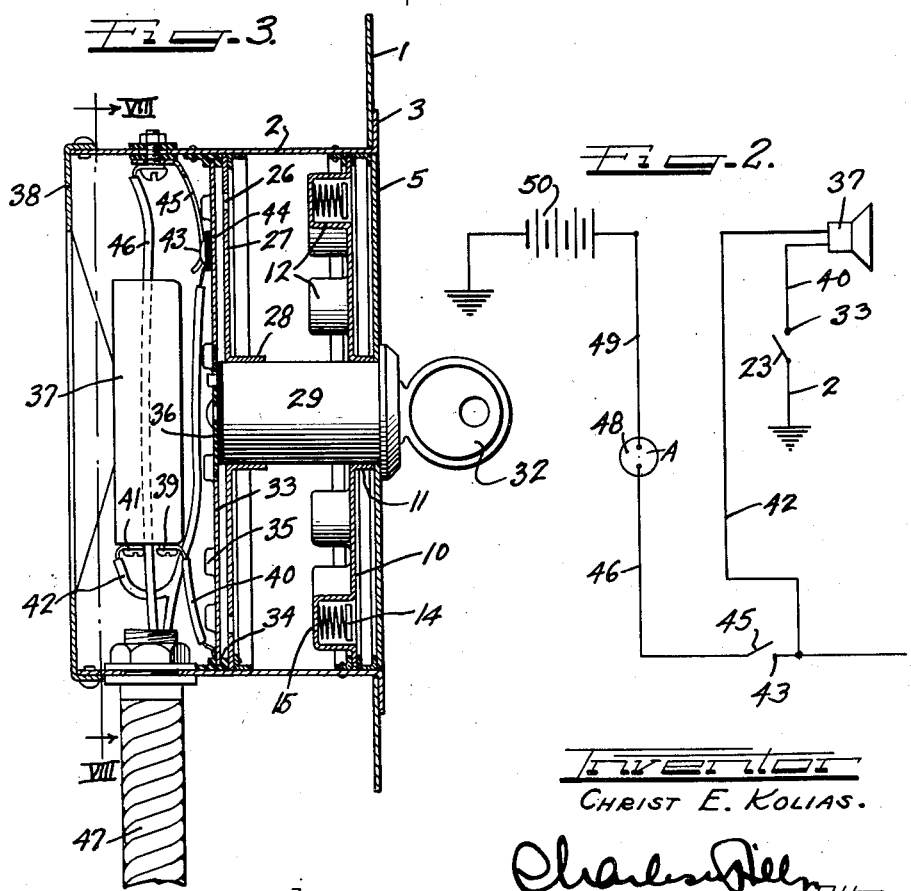
Inventor
CHRIST E. KOLIAS.

Sept. 8, 1942.                C. E. KOLIAS                2,295,178
                      AUTOMOBILE THEFT INDICATOR
                        Filed July 14, 1941            3 Sheets-Sheet 2
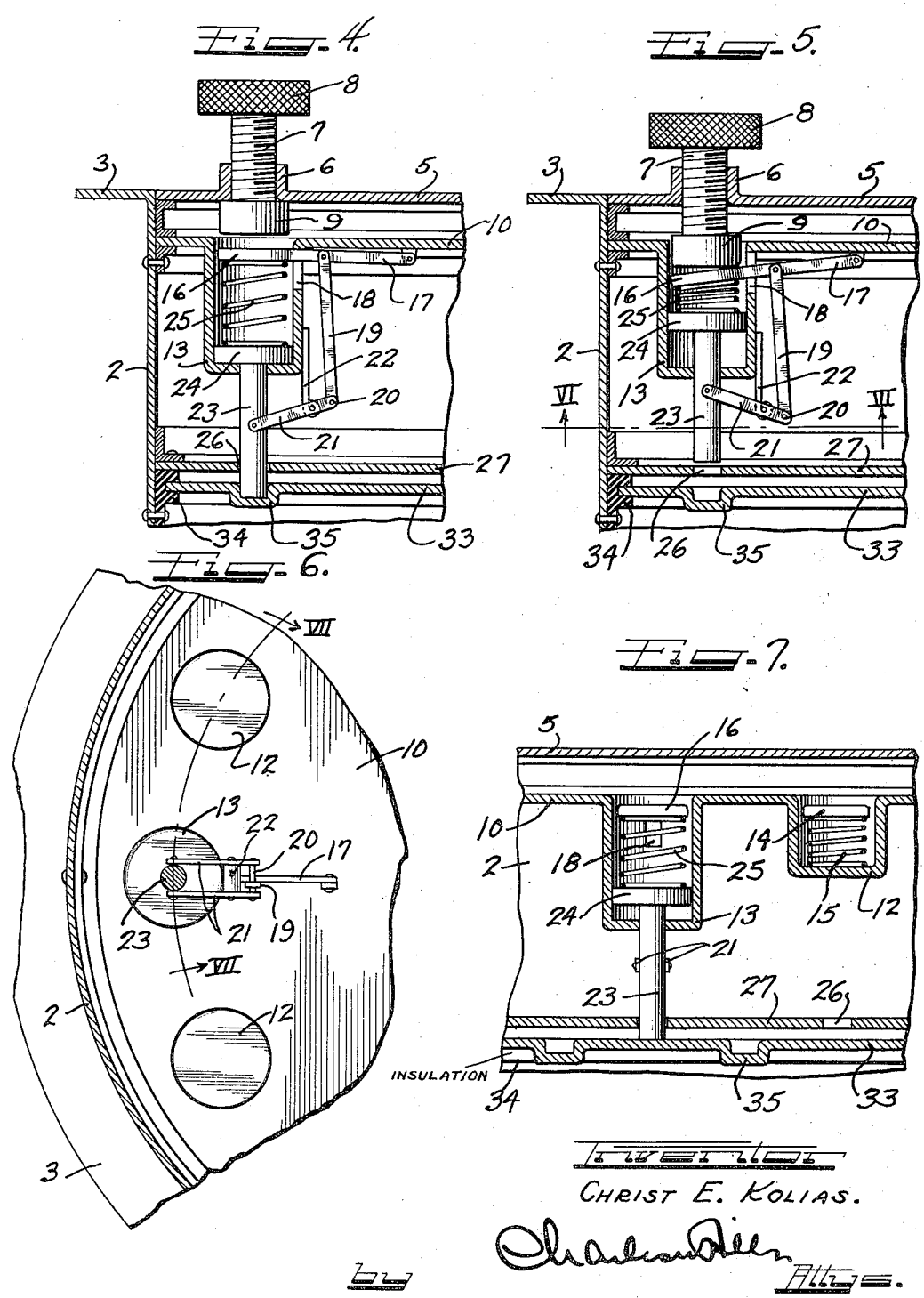

Sept. 8, 1942.        C. E. KOLIAS        2,295,178
AUTOMOBILE THEFT INDICATOR
Filed July 14, 1941        3 Sheets-Sheet 3

Inventor
CHRIST E. KOLIAS.
by Charles Allen
Attys.

Patented Sept. 8, 1942

2,295,178

UNITED STATES PATENT OFFICE 2,295,178

AUTOMOBILE THEFT INDICATOR

Christ E. Kolias, Chicago, Ill.

Application July 14, 1941, Serial No. 402,322

11 Claims. (Cl. 177—314)

The present invention relates to automobile or vehicle theft indicators or signals adapted for use in an automobile or in other devices employing a key operated ignition switch mechanism. The improved indicator is adaptable for mounting on an automobile instrument board or panel and has the automobile ignition switch lock supported therein and connected therewith so that if any unauthorized person should attempt to steal the automobile a continuous audible signal would be set in operation when the ignition lock is operated by means of a key or an improvised implement, so that the audible signal will notify the owner of the automobile that an attempt is being made to steal the car.

It is an object of this invention to provide an improved type of automobile theft indicator for use in combination with an automobile ignition switch lock, said indicator being constructed to permit selective setting of the same to cause continuous operation of an audible alarm when the ignition switch lock is turned on by an unauthorized person or by a thief attempting to steal the automobile.

It is also an object of this invention to provide an improved type of vehicle theft indicator adapted to be conveniently located on the vehicle instrument board, or in any other suitable location, and having associated therewith the vehicle ignition switch lock, the operation of which causes closing of an audible alarm circuit to cause continuous operation of the alarm which cannot be shut off except by a person knowing the release combination for which the indicator was set for obviating theft of the automobile or unauthorized use thereof.

It is a further object of this invention to provide a vehicle theft indicator including an alarm mechanism the operation of which is governed by the selective setting of control mechanism adapted to be released by the turning on of the vehicle ignition switch, the lock of which is connected with the indicator and the control mechanism thereof.

It is furthermore an object of this invention to provide a vehicle alarm indicator or signal adapted to be conveniently mounted within an automobile and connected with the battery thereof, said indicator including an alarm device and a plurality of rotatable and stationary dials for selectively setting auxiliary switch mechanisms adapted to be closed in sequence when the ignition switch lock of the automobile is operated by an unauthorized person attempting to steal the automobile, said operation of the lock causing continuous operation of the alarm which can only be shut off by a person knowing the release combination for which the indicator mechanisms were set.

Still another object of the invention is the provision of an automobile theft indicator or signal adapted to be associated with the automobile switch ignition lock and including a plurality of switch mechanisms adapted to be set and controlled by a plurality of rotatable dials and a stationary dial to permit a continuously operable audible alarm to be set in operation when the ignition switch lock is turned on, said alarm adapted to be shut off only by the release of the set combination by an authorized person knowing the combination for which the indicator is set.

It is an important object of this invention to provide an improved and effective form of an audible alarm indicator or signal for use on automobiles and other portable vehicles adapted to be started by the use of an ignition switch lock, said indicator being associated with the ignition switch lock and having control mechanisms adapted to be selectively operated or set for a particular combination so that when an unauthorized person attempts to steal the automobile by turning on the ignition switch by means of the key operated ignition switch lock, said lock has the barrel thereof connected with the control mechanisms of the indicator to close a switch circuit to an audible alarm so that the alarm will continuously operate and can only be turned off by an authorized person knowing the combination for which the indicator has been set so that a combination secondary switch member and lock may be released to unlock the ignition switch lock and the control dial operable thereby so that the control dial may be operated by the ignition lock key to open the main switch in the audible alarm circuit thereby restoring the control mechanisms of the indicator to normal positions and permitting the ignition switch lock to be turned on by means of the key so that the automobile may be started and driven without operation of the audible alarm.

Other and further important objects of this invention will be apparent from the disclosures in the specification and the accompanying drawings.

In the drawings:

Figure 1 is a fragmentary front view of an automobile instrument board or panel equipped with an improved automobile theft indicator or signal embodying the principles of this invention and having the automobile key operated ignition switch lock associated therewith.

Figure 2 is a schematic form of wiring diagram for the indicator.

Figure 3 is a sectional view taken on line III—III of Figure 1, with parts shown in elevation.

Figure 4 is an enlarged fragmentary detail section taken on line IV—IV of Figure 1, with parts shown in elevation with the control bolt in a release position and showing the spring controlled combination switch and lock in a circuit closing and locking positon for causing continuous operation of an audible alarm and at the same time locking the automobile ignition switch lock from being turned off.

Figure 5 is an enlarged fragmentary sectional view similar to Figure 4 but showing the control bolt moved into a position to release the set combination of the indicator by causing retraction of the combination switch unit and locking member.

Figure 6 is an enlarged fragmentary detailed sectional view taken on line VI—VI of Figure 5.

Figure 7 is a fragmentary sectional view taken on line VII—VII of Figure 6 with parts shown in elevation and illustrating the position of the combination switch unit and locking member set in a position ready to be moved by its control spring into a switch closing and locking position, as shown in Figure 4, when a control dial of the indicator is partially rotated by operating the automobile ignition switch lock.

Figure 8:
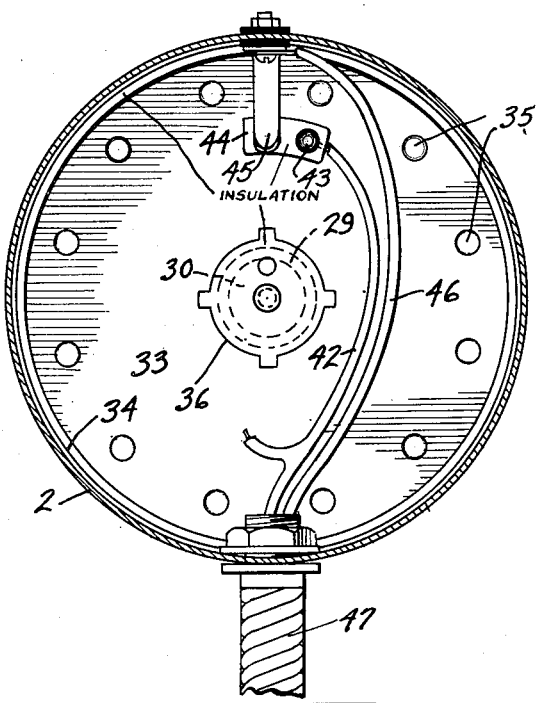

Figure 8 is an interior sectional view of the bottom portion of the indicator taken on line VIII—VIII of Figure 3 with the audible alarm unit omitted.

Figure 9:
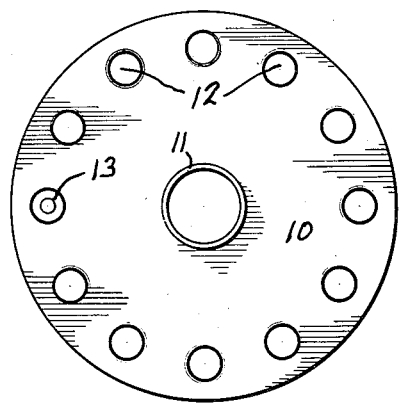

Figure 9 is a plan view of the second control dial of the indicator removed from the indicator casing.

Figure 10:
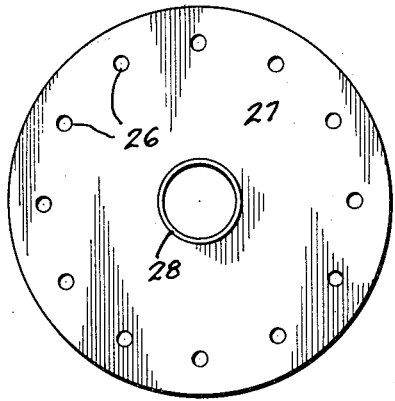

Figure 10 is a plan view of the third or stationary dial of the indicator removed from the indicator casing.

Figure 11:
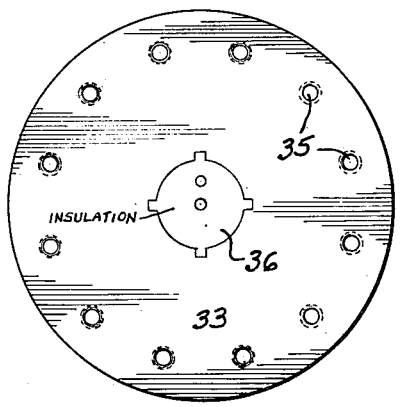

Figure 11 is a plan view of the fourth or main control dial of the indicator removed from the indicator casing.

As shown in the drawings:

The improved selectively operable theft indicator or signal is adapted for use on vehicles such as automobiles and the like, and on other portable devices equipped with a key operated control or ignition switch lock, to permit the automobile or device to be run. The indicator or signal unit is provided for the purpose of obviating theft or running of an automobile by unauthorized persons, and is constructed to produce a continuously operable audible signal or alarm set off by the turning on and the simultaneous locking of the ignition switch lock of the automobile, so that it cannot be turned off again when once turned on unless the combination is released.

The ignition switch lock is associated with the indicator which may be mounted on the instrument panel of the automobile. The audible alarm when operating can only be shut off by an authorized person knowing the release combination for which the indicator is selectively set by the owner of the automobile, when the same is parked.

In the present showing the improved theft indicator is located in an automobile instrument panel or board 1 which is provided with an opening for receiving the indicator housing or casing 2. The casing 2 is formed with an outer or front flange 3 having a graduated or divided scale or index 4 thereon the division marks of which are numbered or may be designated by letters or other suitable symbols to facilitate a selective setting of the indicator when the automobile is parked. The flange 3 overlaps the instrument panel 1 and is rigidly secured thereto by any suitable means.

Mounted in the front or outer end of the casing 2 is a rotatable first control dial or setting disk 5 the outer face of which is flush with the face of the flange 3 and closes the casing 2. Provided on the top surface of the first dial 5 near the margin thereof is a setting mark or arrow 51 which is positioned radially with respect to an internally threaded collar or ring 6 which is integrally formed on the first dial 5 for the reception of an adjustable externally threaded shank 7 of a control bolt.

The control bolt shank 7 has a knurled outer operating knob or head 8 secured on the outer end thereof, to facilitate rotation of the first dial 5 with respect to the casing 2, so that the setting arrow on the first dial 5 may be set with respect to the graduated index 4 to facilitate setting of the combination for governing the operation of the indicator. Rigidly secured on the inner end of the bolt shank 7 is an inner head or control knob 9 for setting the inner control mechanism of the indicator. The control bolt mechanism is not only used for arranging for a selective combination to cause an audible alarm to be given when the automobile ignition switch lock is turned on, but is also used for permitting an authorized person knowing the set combination to release the same so that the audible alarm may be discontinued in case it has been set off by a thief attempting to steal the automobile.

Rotatably mounted within the casing 2 is a second dial or switch disk 10 formed with a central collar or sleeve 11 which projects outwardly towards the first dial 5. Integrally formed in the second dial 10 is a ring of spaced dummy wells or pockets 12 including a switch carrying deeper well or master pocket 13 having an opening in the bottom or inner end thereof. Enclosed in each of the dummy pockets 12 is a dummy button 14 supported on a coiled cushioning spring 15 (Figure 7).

Disposed within the switch pocket 13 is a control button 16 which is integrally formed on one end of a radially projecting arm 17 which projects through a guide slot 18 in the pocket 13 and has the outer end pivoted to a lug on the inner face of the second dial 10.

Pivotally connected to the arm 17 is one end of a connecting toggle or link 19, the other end of which is pivoted to a connecting pin 20 supported between a pair of arms 21 fulcrumed on a supporting bracket 22 fastened to the exterior of the switch pocket 13. The parallel arms 21 project on opposite sides of a secondary control switch and locking stem 23 to which said arms 21 are pivotally connected. The combination switch and locking stem 23 slidably projects through the opening in the bottom of the switch pocket 13. Secured on the end of the switch stem 23 is a switch head 24 disposed within the pocket 13. Also placed within the pocket 13 is a switch control spring 25 which seats between the switch head 24 and the switch control button 16 to move the switch stem 23 downwardly or inwardly when the control bolt head 8 is retracted out of the pocket 13 as shown in Figure 4.

When the combination switch and lock stem 23 is actuated by the action of the released spring 25 the end of the stem 23 is projected through any one of a circle of spaced openings 26 provided in a third dial or lock disk 27 which is stationary within the indicator housing 2. The dial 27 is formed with a central opening surrounded by a collar or sleeve 28.

The automobile ignition switch lock unit is mounted axially within the indicator housing 2 as shown in Figure 3, and consists of a cylindrical ignition switch lock case 29 which has the inner end thereof rigidly secured in the collar 28 of the stationary lock dial 27. The switch lock case 29 also projects through the collar 11 of the second rotatable dial 10 and through the central opening of the first rotatable dial 5.

Rotatably mounted within the ignition switch lock case 29 is a switch lock barrel 30 provided with the customary slot 31 for the reception of a key 32 for turning the ignition on and off.

Insulated from the inner end of the ignition switch lock barrel 30 and rigidly secured thereto to be partially rotated thereby, is a center insulation plate 36 of a fourth dial or main switch control disk 33 which is rotatably mounted within the indicator casing 2 in a suitable insulation guide support 34. The main switch control dial 33 is formed with a circle of spaced cups or pockets 35 for the reception of the end of the combination switch and lock stem 23 when the fourth control dial 33 is partially rotated by the turning of the ignition lock barrel 30 from the position shown in Figure 7 into the position illustrated in Figure 4 until the nearest cup 35 is moved into a position to register with the combination switch and lock stem 23 to permit the spring 25 to force the switch stem 23 into the registering cup 35 thereby not only closing the secondary or auxiliary switch but also locking the second dial 10 and the fourth dial 33 to the stationary dial 27 so that the ignition switch lock barrel 30 which has been partially rotated by the key 32 to turn on the ignition switch of the automobile is locked in open position and cannot be rotated back to turn off the ignition switch of the automobile. An authorized person who has set the combination for the indicator may now rotate the first dial 5 to the proper station to position the indicating arrow 51 on the dial 5 in register with a particular number or symbol on the scale 4 so that the control bolt operable by the head 8 may be moved from the position indicated in Figure 4 into the casing 2 to cause the bolt head 9 to enter the master pocket 13 and contact the button 16 to actuate the mechanism connected with the combination switch and lock stem 23 to retract the same out of the locking position illustrated in Figure 4 into the release position illustrated in Figure 5. The fourth control dial 33 is thereby freed or released to break the circuit to the audible alarm of the indicator so that the automobile can be run since the ignition switch is already turned on or permitting the ignition to be turned off by means of the key 32 thereby partially rotating the fourth dial 33 back into the normal position illustrated in Figure 7 in which the lock pockets 35 are moved out of register with the openings 26 of the stationary or third dial 27.

Mounted within the indicator casing 2 is an audible signal or alarm in the form of a horn 37, the mouth piece of which may be mounted to open through the bottom or closure plate 38 of the indicator casing 2 as illustrated in Figure 3.

One terminal 39 of the electrically operated horn 37 has one end of a connecting wire 40 attached thereto. The other end of the wire 40 is connected to the fourth control dial 33 which together with the switch stem 23 form the secondary or auxiliary switch in the circuit diagram illustrated in Figure 2. A second terminal 41 has one end of a connecting wire 42 connected thereto. The second end of the wire 42 is connected to a terminal 43 mounted on an installation strip 44 which is secured upon the bottom surface of the fourth control dial 33 as is clearly illustrated in Figure 8. The switch control terminal 43 is so located that when the fourth control dial 33 is partially rotated by the rotation of the ignition switch lock barrel 30 by means of the key 32, said switch terminal 43 is moved from the open position illustrated in Figure 8 into a position to contact a resilient main switch arm 45 which together with the contact terminal 43 forms the main switch of the indicator circuit. The switch arm 45 is secured to the interior of the indicator casing 2 and is properly insulated therefrom as illustrated in Figure 3. Connected to the switch arm 45 is one end of a line wire 46 which leads out of the indicator casing 2 by way of an armored conduit 47 and is connected to the ammeter 48 of the automobile. The ammeter 48 is connected by means of a wire 49 to the automobile battery 50 as indicated in the wiring diagram schematic of Figure 2.

In the form of the indicator as illustrated and described, the indicator circuit includes the primary or main switch, consisting of the members 43 and 45, and the auxiliary or secondary switch, consisting of the members 23 and 33, which switches govern the operation of the audible alarm or horn 37 mounted in the indicator casing 2. With the indicator circuit as shown, the regular ignition switch of the automobile is connected for operation by means of the key operated ignition switch lock 29 so that when the indicator has been set for operation at a predetermined combination or position of the auxiliary switch mechanism and an unauthorized person uses the key or other instrument for turning on the automobile ignition switch lock 29 to rotate the lock barrel 30 both the main switch of the indicator circuit and the automobile ignition switch are closed so that the audible alarm of the indicator will be in operation and cannot be stopped for the reason that the ignition switch lock is locked in open position and cannot be shut off until an authorized person knowing the combination for which the indicator has been set releases the switch pin 23 to permit the fourth control dial 33 to be rotated back into normal position to open the main switch to thereby stop blowing of the horn or audible alarm 37.

If, however, it is desired to use the automobile ignition switch in the indicator alarm circuit the switch members 43 and 45 may be omitted and the regular automobile ignition switch substituted therefor.

While a separate audible alarm signal in the form of the electrically operated horn 37 is used in the indicator casing 2 it will of course be understood that the regular horn of the automobile may be connected in the indicator alarm circuit so that the automobile horn will give the alarm when an attempt is made to steal the automobile when the indicator is set. The automobile horn may thus be used as the audible alarm signal in connection with the use of the indicator and may also be used in the customary manner when a driver of the automobile wishes to operate the horn. When the automobile horn is to be used in place of the indicator horn 37 a regular horn circuit and the indicator circuit may be connected in parallel with the automobile battery.

Normally the fourth control dial 33 of the indicator device, is positioned as illustrated in Figure 7 so that the locking pockets or cups 35 are moved out of register with respect to the openings 26 in the stationary dial 27. This normal position of the dial 33 is brought about by the use of the ignition key 32 when the ignition lock is turned off to open the automobile ignition switch and allowing the driver of the automobile to remove the key 32 from the ignition lock. The movement of the fourth control dial 33 into the position shown in Figure 7 moves the switch contact 43 out of engagement with the switch arm 45 (Figure 8) to open the main or primary switch controlling the operation of the audible alarm or horn 37.

If desired, the control bolt 7 may normally be held in a raised or elevated position as illustrated in Figure 4 so that by gripping the control bolt knob 8 the first or outermost control dial 5 may be rotated at will thereby permitting the owner of the car to move the indicating arrow 51 into a position to register with a selected number on the index scale 4 to set the combination for the indicator so that the inner head 9 of the control bolt 7 is in position to register with the switch pocket 13 of the second control dial 10. The control bolt 7 is then screwed downwardly into the position illustrated in Figure 5 so that the bolt head 9 projects into the pocket 13 and into engagement with the control button 16 to swing the same downwardly about its pivotal support thereby operating the toggle members 19 and 21 to cause the combination switch and locking stem 23 to be moved upwardly from the position illustrated in Figure 4 into the position shown in Figure 5 thereby compressing the control spring 25 and moving the lower end of the stem 23 out of engagement with the fourth control dial 33 and the stationary dial 27 to open the auxiliary or secondary switch of the audible alarm circuit.

With the combination switch and lock stem 23 in the raised position shown in Figure 5 the owner of the automobile may take hold of the control knob 8 and rotate both the first control dial 5 and the second control dial 10 simultaneously so that the indicating arrow 51 is positioned to register with any of the marks or symbols on the scale 4 in order to position the combination switch and lock stem 23 for a predetermined or set combination of the indicator. After the combination has been set the control bolt 7 is turned to retract the inner head 9 out of the pocket 13 thereby permitting the first control dial 5 to be rotated promiscuously so that if the control bolt 7 is again turned downwardly when the indicating arrow registers with any other of the numbers on the scale 4 than the one for which the combination has been set, the control bolt will merely engage in one of the dummy pockets 12 into engagement with one of the dummy buttons 14 to compress the supporting spring 15. This operation will lock the first dial 5 to the second dial 10.

When the control bolt 7 is retracted from the position illustrated in Figure 5, the compressed spring 25 acts to project the combination switch and locking stem 23 downwardly through one of the openings 26 in the stationary or locking dial 27 and into engagement with the top surface of the fourth control dial 33, as shown in Figure 7, so that the auxiliary or secondary switch of the audible alarm or horn circuit is set ready to be released. The indicator is thereby selectively set by the owner of the automobile when the car is parked, so that should an unauthorized person or any one intending to steal the automobile attempt to operate the automobile ignition switch lock 29 with a stolen key, a skeleton key or any other instrument which might cause rotation of the lock barrel 30, a continuously operating audible alarm will be set off to give an audible signal to the owner of the automobile that some one is attempting to steal the same.

When a stolen key or other device is projected into the lock barrel 30 and said barrel is rotated, the fourth control dial 33 which is connected with the lock barrel is partially rotated from the position illustrated in Figure 7 to the position illustrated in Figure 4 in which position one of the locking cups or pockets 35 of the dial 33 is moved into register with the lower end of the stem 23 thereby permitting the spring 25 to project the stem downwardly into the registering pocket 35 thereby simultaneously closing the auxiliary or secondary switch 23—33 of the alarm circuit and also the ignition or main switch 43—45 of the alarm circuit by the partial rotation of the dial 33. The two switches of the alarm circuit are thereby simultaneously closed by the roation of the lock barrel 30 thereby completing the circuit to the audible alarm or horn 37 to cause the same to operate continuously.

With the setting off of the audible alarm by the unauthorized operation of the lock barrel 30 the fourth control dial 33 is locked against further operation with the stationary dial 27 so that the unauthorized person who has operated the lock barrel 30 cannot turn back the lock barrel and therefore cannot remove the key operating the same. It will therefore be apparent that the person attempting to steal the automobile will become alarmed and will abandon the same.

With the ignition switch turned on, there of course is a possibility of the thief running the car but the car must be operated with the audible alarm continuously operating so that the operator of the car will lay himself open to capture by an officer hearing the burglar alarm.

If the thief attempts to turn off the audible alarm by rotating the first dial 5 by means of the knob 8 when the control bolt 7 is raised as shown in Figure 4, he will be unsuccessful in his attempt to shut off the alarm. In case he operates the control bolt 7 so that it will project downwardly toward the second dial 10, the bolt head 9 will undoubtedly be moved into one of the dummy pockets 12 thereby causing locking of the first dial 5 to the dial 10 which in turn is locked against operation by the locking stem 23 which is engaged in the stationary third dial 27. It will therefore be practically impossible for the thief to shut off the audible alarm unless he knows the combination for which the indicator is set.

It would be a long drawn out process for the thief to try all the different combinations in order to position the control bolt 7 in register with the main pocket 13 to bring about release of the stem 23 to open the alarm circuit to cause discontinuation of the audible alarm.

It will thus be seen that the improved automobile theft indicator or signal may be used on an automobile or other portable vehicle in associated relationship with the ignition switch lock to be controlled by the operation thereof. The operator may set the indicator, when the automobile is parked, for a particular combination which will set off the continuously operable audible alarm in case an attempt is made to steal the automobile by turning on the ignition switch lock by an unauthorized person.

It will of course be understood that various details of construction may be varied through a wide range without departing from the principles of this invention, and it is, therefore, not the purpose to limit the patent granted hereon otherwise than necessitated by the scope of the appended claims.

I claim as my invention:

1. An automobile theft indicator including in combination a casing for mounting in the automobile, an index thereon, an ignition switch lock within the casing, an audible alarm in the casing, a plurality of rotatable and stationary control dials in the casing, switch mechanisms carried by the rotatable control dials and connected with the audible alarm, and a combination setting mechanism on one of the rotatable dials adapted to be selectively set with respect to the index to close the switch mechanisms and lock the rotatable dials with the stationary dial when the ignition switch lock is turned on causing continuous operation of the audible alarm.

2. An automobile theft indicator including in combination an indicator casing for mounting in an automobile, an ignition switch lock mounted in the casing, a plurality of rotatable control dials and a stationary control dial in the casing with one of said rotatable control dials connected for operation by the ignition switch lock, an audible alarm in the casing, a switch connecting the audible alarm with the rotatable dial which is operable by the ignition switch lock, and a selectively settable combination control switch and lock mechanism carried by two of the rotatable control dials and adapted to be set in a predetermined position for release by the control dial operable by the ignition switch lock to permit said switch and lock mechanism to coact with the stationary control dial and with the control dial operable by the ignition switch lock to cause continuous operation of the audible alarm and locking of the ignition switch lock in open position until the set combination of the combination switch and lock mechanism is released.

3. An automobile theft indicator including in combination a combination switch and lock mechanism, a casing for containing the same, means for setting said mechanism, an audible alarm in the casing, a switch device connected in series with the audible alarm and with the combination switch and lock mechanism, a source of electrical energy connected with the switch device, and an automobile switch ignition lock mounted in the casing and connected in series with the combination switch and lock mechanism and adapted to be key operated to release and permit closing of the combination switch and also close the switch device to cause continuous operation of the audible alarm and locking of the ignition switch lock in open position by the released combination switch and lock mechanism.

4. An automobile theft indicator including in combination a combination switch and lock mechanism, a casing for containing the same, an audible alarm in the casing, a switch device connected in series with the audible alarm and with the combination switch and lock mechanism, a source of electrical energy connected with the switch device, an automobile switch ignition lock mounted in the casing and connected in series with the combination switch and lock mechanism and adapted to be key operated to close the switch device to permit operation of the automobile, and means in the casing for selectively setting the combination switch and lock mechanism to cause simultaneous closing of the switch device, release and closing of said mechanism and operation of the audible signal when the switch ignition lock is turned on, said means being operable to cause opening and retraction of the combination switch and lock mechanism to shut off the audible alarm.

5. An automobile theft indicator including in combination a casing, a graduated scale on the casing, a first control and setting dial rotatably mounted to close the casing and having an indicating arrow for coaction with the scale, a second control dial rotatably mounted within the casing, a combination switch and lock element carried by the second control dial, a control bolt member adjustably carried by the first control dial and movable into and out of coacting relation with the second control dial and with the combination switch and lock element to set and release the same, an apertured stationary third control dial secured in the casing for coaction with the combination switch and lock element to permit the same to be projected therethrough or retracted from engagement therewith, an automobile ignition switch lock supported on the stationary dial within the casing and projecting through the first and second dials, a key operated rotatable barrel forming a part of the ignition switch lock, a fourth control dial rotatably mounted in the casing and secured to the lock barrel for operation thereby and serving as a stop for the combination switch and lock element when the same is projected through the stationary dial, said fourth control dial having a series of locking pockets formed therein for receiving the combination switch and lock element when the fourth control dial is rotated by operation of the lock barrel, an audible alarm in the casing and connected with the fourth control dial, a switch terminal on the fourth control dial connected with the audible alarm, a switch member in the casing positioned to be contacted by the switch terminal on the fourth control dial when said dial is rotated by operation of the lock barrel, and means for connecting the switch member with a source of electrical energy to cause continuous operation of the audible alarm and locking of the lock barrel in open position when the lock barrel is rotated to turn on the automobile ignition switch to move the fourth control dial to a position to be locked by the combination switch and lock element and simultaneously causing the switch terminal on the fourth control dial to be moved into contact with the switch member within the casing to close the circuit to the audible alarm for the continuous operation thereof until the combination switch and lock element is released by the proper positioning of the first control dail and the operation of the control bolt carried thereby.

6. An automobile theft indicator including a casing, a graduated scale on the casing, a first dial rotatably mounted in the casing and carrying an indicating arrow for coaction with the scale, a control bolt member adjustably carried by the first dial and projecting into the casing, a second control dial rotatably mounted in the casing, a plurality of dummy pockets formed thereon, spring supported dummy buttons in said dummy pockets, a main pocket formed on the second control dial, a main control button in said main pocket, a combination switch and locking stem slidably mounted in the main pocket and projecting therefrom, a toggle mechanism connecting the main button with said stem to cause retraction of the stem when the control bolt is moved into the main pocket and into engagement with the main button, a third control dial rigidly secured in the casing and having a plurality of apertures therein for receiving the combination switch and locking stem and for locking the second control dial against rotation within the casing, a fourth control dial rotatably mounted in the casing and insulated therefrom, said fourth control dial normally positioned to serve as a stop for the combination switch and lock stem when the same is projected through the stationary dial, a plurality of locking pockets formed in the fourth control dial, an automobile switch ignition lock mounted in the casing and secured to the stationary dial and projecting through the rotatable first and second dials, a lock barrel forming a part of said lock and secured to the fourth dial and insulated therefrom, an audible alarm mounted in the casing and connected to the fourth dial, a switch contact on the fourth dial connected with the audible alarm, a switch member mounted in the casing and insulated therefrom, said switch member being mounted in position to be contacted by the switch terminal on the fourth dial when the same is rotated by turning the ignition switch lock barrel and moving one of the locking pockets on the fourth dial into position to register with and receive the combination switch and lock stem and cause continuous operation of the audible alarm and locking of the lock barrel against closing until the first dial is rotated into a predetermined position to register with the main pocket in the second dial and is then actuated to cause retraction of the combination switch and lock stem to break the circuit to the audible alarm, and means connecting the switch members in the casing with a source of electrical energy for operating the audible alarm when the lock barrel is operated by an unauthorized person when the combination of the automobile theft indicator is set.

7. An automobile theft indicator comprising a source of electrical energy, an audible alarm connected in series therewith, a main control switch connected to the audible alarm, a key operated control for closing and opening the main switch, a combination auxiliary switch and lock connected in series with the main switch and releasable by the key operated control when the same is turned on to close both the auxiliary switch and lock and the main switch to continuously operate the audible alarm, a rotatable control mechanism for movably supporting the auxiliary switch and lock, and means operable with respect to the rotatable control mechanism to permit the auxiliary switch and lock to be selectively set by an authorized person for secret release when the key operated control is turned on.

8. An automobile theft indicator comprising a source of electrical energy, an audible alarm connected therewith, a main control switch connected to the audible alarm, a key operated control for closing and opening the main switch, a combination auxiliary switch and lock connected with the main switch and releasable by the key operated control when the same is turned on to close both the auxiliary switch and lock and the main switch to continuously operate the audible alarm, a movable support for the auxiliary switch and lock, and means for selectively moving the support and the auxiliary switch and lock into a secret combination to permit the combination switch and lock to be released by operation of the key operated control for continuous operation of the audible alarm and locking of the key operated control in open position until said means is released with the aid of the secret combination to release the auxiliary switch and lock.

9. An automobile theft indicator including in combination an audible alarm, a source of energy for operating the same, a main switch connected between the source of energy and the audible alarm, an auxiliary switch connected in series with the main switch and with the audible alarm, a key operated lock governing the closing of the main switch and the auxiliary switch to cause operation of the audible alarm, a movable member between the lock and the main switch, a movable support for carrying the auxiliary switch, an apertured stationary member between the movable member and said movable support, and means for operating the movable support and secretly setting the auxiliary switch with respect to the stationary member to be projected therethrough into engagement with the movable member for automatic closing when the lock is operated simultaneously closing both the main switch and the auxiliary switch to continuously operate the audible alarm, said means movable into a position foreign to the combination setting of the auxiliary switch to prevent opening of the auxiliary switch when the set combination is unknown.

10. The combination with an automobile ignition switch circuit and the ignition switch lock controlling the same, of an audible alarm connected in said circuit, a combination switch and locking mechanism connected in said circuit and releasable by the turning on of the ignition switch lock to simultaneously move into a closed position with the closing of the ignition switch circuit by the operation of said lock, said combination switch and locking mechanism when closed also acting as a lock for the ignition switch lock to hold the same in turned on position with a continuous operation of the audible alarm, a switch control dial operable by the ignition switch lock, a stationary dial for use in combination with the switch control dial and with the combination switch and lock mechanism, a rotatable switch supporting dial for carrying the combination switch and lock mechanism and for moving the same into a set combination for coaction with the stationary dial and the switch control dial operable by the ignition switch lock, a control dial rotatably mounted for use in combination with the switch supporting dial, a control bolt carried by the control dial and adjustable with respect thereto to permit rotation of the control dial alone or adapted to be positioned to coact with the switch control dial to cause simultaneous rotation of the control dial with the switch supporting dial for a secret setting of the combination switch and lock mechanism, an indicating arrow on the control dial, and a graduated scale positioned for use in combination with the control dial to facilitate the secret setting of the combination lock and switch mechanism and the release thereof only by means of the use of the secret combination for which the theft indicator is set.

11. The combination with an automobile ignition switch lock and the ignition switch controlled thereby, of a theft control connected with the ignition switch lock and including a combination switch and lock element controlled by the operation of the ignition switch lock and connected in series with said ignition switch, means forming part of the theft control for selectively and secretly setting the combination switch and locking element for operation by the turning on of the ignition switch lock, an alarm connected in series with the ignition switch and the combination switch and locking element and set in operation when the ignition switch lock is turned on, and control mechanism forming part of the theft control to facilitate release of the combination switch and lock element with a knowledge of the combination for which the theft control is set.

CHRIST E. KOLIAS.